(12) United States Patent
Ngo et al.

(10) Patent No.: US 9,043,014 B2
(45) Date of Patent: May 26, 2015

(54) APPARATUS, AND ASSOCIATED METHOD, FOR GENERATING AN INFORMATION TECHNOLOGY INCIDENT REPORT

(75) Inventors: Dung Ngo, Mountain View, CA (US); Grant I. Campbell, Oshawa, CA (US); Beth McGreevy, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2406 days.

(21) Appl. No.: 11/844,224

(22) Filed: Aug. 23, 2007

(65) Prior Publication Data

US 2009/0055720 A1    Feb. 26, 2009

(51) Int. Cl.
    G06F 17/00    (2006.01)
    G06Q 10/10    (2012.01)
    G06F 3/12     (2006.01)
    H04L 12/26    (2006.01)
    H04L 12/24    (2006.01)

(52) U.S. Cl.
    CPC ............... *G06Q 10/10* (2013.01); *G06F 3/126* (2013.01); *H04L 41/22* (2013.01); *H04L 41/5074* (2013.01); *H04L 43/0817* (2013.01)

(58) Field of Classification Search
    CPC ....... G06F 3/126; G06F 17/00; G06F 17/243; G06Q 10/06
    USPC ................ 715/200, 205, 221, 226, 230, 231
    See application file for complete search history.

(56) References Cited

U.S. PATENT DOCUMENTS

| | | | |
|---|---|---|---|
| 6,219,692 B1 * | 4/2001 | Stiles | 709/201 |
| 6,687,335 B1 * | 2/2004 | Jones et al. | 379/1.01 |
| 7,127,444 B2 | 10/2006 | Peake, Jr. | |
| 7,802,204 B2 * | 9/2010 | Merry et al. | 715/846 |
| 2004/0148385 A1 | 7/2004 | Srinivasan | |
| 2005/0157865 A1 * | 7/2005 | Yeager et al. | 379/266.06 |
| 2006/0248147 A1 * | 11/2006 | Hill et al. | 709/206 |
| 2007/0033546 A1 * | 2/2007 | Merry et al. | 715/837 |
| 2007/0088625 A1 * | 4/2007 | Fish | 705/26 |
| 2007/0088723 A1 * | 4/2007 | Fish | 707/100 |
| 2008/0127236 A1 * | 5/2008 | Beisiegel et al. | 719/331 |
| 2009/0265585 A1 * | 10/2009 | Ikegami | 714/46 |

* cited by examiner

*Primary Examiner* — Stephen Hong
*Assistant Examiner* — Gregory J Vaughn
(74) *Attorney, Agent, or Firm* — Hewlett-Packard Patent Department

(57) ABSTRACT

Apparatus, and an associated method, for generating a trouble ticket related to an IT incident. When an IT incident occurs, a worklog is formed by a reporter that enters information associated with the incident. Successive inputs, made by appropriate personnel, are made to update the status of the incident. A table-of-contents is formed, associated with the collection of entries of information. And, each entry of information is categorized, to identify the entry by an associated category.

4 Claims, 6 Drawing Sheets

72

| Worklog Search: | Ping |

62 → Entry #1: Diagnostics: Mon Eng # 007
Entry #2: Diagnostics: John Smith
Entry #3: Break-fix: Jim Jones  ~ 64
Entry #4: Verification: Mon Eng # 007
Entry #5: Closing: Mon Eng # 007

- - - - - - - - - - - -

Entry # 1  ~ 64                                74
Category: Diagnostics  ~ 96
Author: EDS Monitoring Engineer # 007
Update: The ping test resulted in a confirmation that this server is down.
Will escalate ticket to Datacenter support team for investigation.

⋮

Entry # 4  ~ 64                                74
Category: Verification  ~ 96
Author: EDS Monitoring Engineer # 007
Update: Verified that server 1234 is no longer ping timed out. This issue
looks to be resolved. Waiting for final confirmation from the customer.

FIG. 4

APPARATUS, AND ASSOCIATED METHOD, FOR GENERATING AN INFORMATION TECHNOLOGY INCIDENT REPORT

The present invention relates generally to a manner by which to create a trouble ticket, or other IT-incident report, that pertains to an IT (Information Technology) incident. More particularly, the present invention relates to apparatus, and an associated method, by which to provide for creation of a trouble ticket having a running worklog, configured in a manner to increase its readability and usability.

When an entry is made to the worklog, an anchor link forming a table of content entry is created. The resultant table of contents form linkable connections to the corresponding entries to the worklog. A category menu is further provided when an entry is made. The category menu provides for selection of a category to which the entry pertains, such as an initial incident report, a diagnostics entry, a fix report, etc. Readability problems resulting from use of conventional trouble tickets, structured in running, diary format, are less likely to occur.

BACKGROUND OF THE INVENTION

Many business, and other, enterprises make regular use of computer processing devices. And, for many, the ready availability of, and use of, computer processing devices is a practical necessity of operation of the enterprise. And, with advancing technologies, the capabilities of such computer processing devices is increasing while the costs of such devices are falling. Increased usage of, and reliance upon, computer devices is likely to increase.

Computer processing, and other, devices are herein referred to as IT (Information Technology) assets. The IT assets are sometimes connected together to permit data to be exchanged between the assets or otherwise to provide for communications therebetween. The interconnections are provided, for instance, by way of a wide area network, either a public or private network. The network sometimes also includes, for instance, wireless connections permitting the connection of an asset to the network by way of a radio link. When networked together, communications between the IT assets permit, e.g., work tasks to be performed at different ones of the assets and the results of the work tasks to be communicated elsewhere. Assessing of work tasks is carried out, for instance, concurrently, using the assets positioned at multiple enterprise locations for different segments of the work tasks are performed at the different enterprise locations in manners best to utilize the capabilities and availabilities of the assets at the different locations.

In many enterprises, an IT organization is encharged with oversight of the IT infrastructure of the enterprise, that is to say the IT organization is encharged, amongst other things, with maintaining the operability of the IT assets of the organization. When the assets are interconnected by way of a network, or other, connection, the assets are sometimes able to be controlled remotely. Personnel of the IT organization are sometimes thereby able remotely to place an IT asset back into service subsequent to a malfunction thereof. Through such capability, the IT organization is better able efficiently to provide personnel that have the greatest, or best available, expertise to diagnose a malfunction and to repair, or otherwise correct, the malfunction. The need otherwise to maintain appropriate personnel at each of the disparate locations of the enterprise is reduced, or obviated.

When the IT organization includes personnel at a location remote from an IT asset at which a malfunction, or other incident, occurs, the personnel must be alerted of the occurrence of the incident. Procedures involving the generation and communication of so-called trouble tickets are sometimes used to alert IT personnel of the IT incident. A trouble ticket is created, e.g., at a computer work station. The trouble ticket typically includes a worklog set forth in diary form that permits entry of information in diary, i.e., free-flow form. Subsequent to an initial report, subsequent reports associated with the incident are also sometimes entered into the worklog. For instance, a first entry pertains to the initial report of the incident, and subsequent entries are made to provide status updates, diagnostic reports, repair reports, etc.

Because of the typical free-flow format of the worklog portion of a trouble ticket, the text of the worklog might become so lengthy as to be difficult to read and comprehend the problem and the status of its resolution. And, as a result, degraded remediation of the problem becomes more likely. Inaccurate status updates, increased MTTR (Mean Time To Repair), and increased confusion related to the incident and its resolution are all more likely to occur due to the potentially poor readability of the worklog.

If an improved manner could be provided by which to form a trouble ticket, or worklog portion thereof, improved readability would be provided. And, improved resolution or other remediation of the incident is more likely to occur.

It is in light of this background information related to resolution of IT incidents that the significant improvements of the present invention have evolved.

SUMMARY OF THE INVENTION

The present invention, accordingly, advantageously provides apparatus, and an associated method, for creating a trouble ticket, or other IT incident report, that pertains to an IT incident.

Through operation of an embodiment of the present invention, a manner is provided by which to provide for creation of a trouble ticket having a running worklog that is configured in a manner to increase its readability and usability.

The worklog is permitting of multiple, successive entries made at successive times. When an entry is made to the worklog, an anchor link bringing an entry to a table of contents is created. The resultant table of contents forms linkable connections to the corresponding entry in the worklog. A category menu is also provided. When an entry is made, the category menu provides for selection of a menu-category with which the entry is associated, thereby permitting categorization of the entry.

In one aspect of the present invention, through the increased readability of the worklog, problems associated with conventional worklogs are reduced or obviated. More accurate status updates are provided, reduced MTTR times are possible, and incorrect remediation operations are less likely to occur.

In another aspect of the present invention, an anchor link is formed for each entry in the worklog or, at least selectably, with selected ones of the entries. The anchor links form the table of contents entries that together are listed in a table-of-contents part of the worklog. The anchor links comprise, for instance, hypertext links that are linked to the associated entry. The table-of-contents provides a summary of the entries. In the event that the worklog includes multiple entries, a review of the table of contents provides a summary of the entries of the worklog. Readability of the worklog is thereby improved. A reviewer of the worklog need not read the entire worklog to learn of the status, and history, of the IT incident with which the trouble ticket is related. If a reviewer requires additional information associated with an entry, identified by an entry on the table of contents, a link is taken from the anchor link, such as by placing a user-interface cursor on the link and selecting the link, a hypertext link, to cause the associated worklog information to be displayed.

In another aspect of the present invention, the anchor link associated with a portion of the worklog, that is to say the associated entry, or other, information is further identified at the start of the entry. The worklog is differentiated into portions, each portion includes the identification of the anchor link. By segmenting the entries into portions, each offset by the anchor-link identification thereof, the readability of the worklog is further enhanced.

In another aspect of the present invention, the table of contents, formed of the anchor-link entries, each associated with an entry to the worklog, appears at the start, i.e., top part, of the worklog. Thereby, the table-of-contents and the worklog are concurrently displayable upon a single screen. Alternately, the table-of-contents and the worklog entries appear on different screens. The table-of-contents first appears, and, responsive to selection thereon, a link is taken to a second screen and the entry associated with the selected anchor link.

In another aspect of the present invention, when an entry is made to the worklog, a category menu is provided with menu-categories available for selection. Together with entry of the worklog information, selection is additionally made of a menu-category in which the worklog entry is best associated. The menu-category selection provides for categorization of updates, i.e., the entries to the worklog. The display of the category menu is, e.g., table-driven. And, upon selection of the menu-category, the selected category forms part of the entry to the worklog segregating, in part, the separate portions of the worklog as well as also based in a data base that identifies the selected category. The separate database, e.g., forms a catalog of actions, available for searching purposes.

In another aspect of the present invention, a search capability is provided. The search capability provides for a key word searching in a worklog or group of worklogs. By providing the search capability, searched-for information is readily located without the need of a reviewer to read significant parts of a worklog to locate the selected information.

In another aspect of the present invention, a spell checker is provided. The spell checker corrects, or alerts an imputer of information of misspelled or otherwise erroneous textual entries. By automatically correcting an erroneous entry or alerting an imputer of an erroneous entry, the resultant text of the worklog is less likely to include misspelled or mistaken information.

Thereby, through operation of an embodiment of the present invention, a trouble ticket is created that is of improved readability to a reviewer. The reviewer is able better quickly to comprehend issues related to an IT incident as well as responses thereto.

In these and other aspects, therefore, apparatus, and an associated method, is provided for generating a ticket related to an IT system incident. A worklog display generator is configured to generate a displayable worklog in which information related to the IT system incident is includable. The worklog forms part of the ticket. An anchor link generator is configured to generate at least a first anchor link associated with a corresponding at least first portion of the information related to the IT system incident that is includable in the displayable worklog generated by the worklog display generator. The first anchor link forms a first table-of-content entry associated with the corresponding at least first portion of the information.

A more complete appreciation of the scope of the present invention and the manner in which it achieves the above-noted and other improvements can be obtained by reference to the following detailed description of presently-preferred embodiments taken in connection with the accompanying drawings, which are briefly summarized below, and by reference to the appended claims.

BRIEF DESCRIPTION OF THE DRAWINGS

FIG. 4 illustrates another display, illustrating further exemplary operation of an embodiment of the present invention.

DETAILED DESCRIPTION

Figure 1:
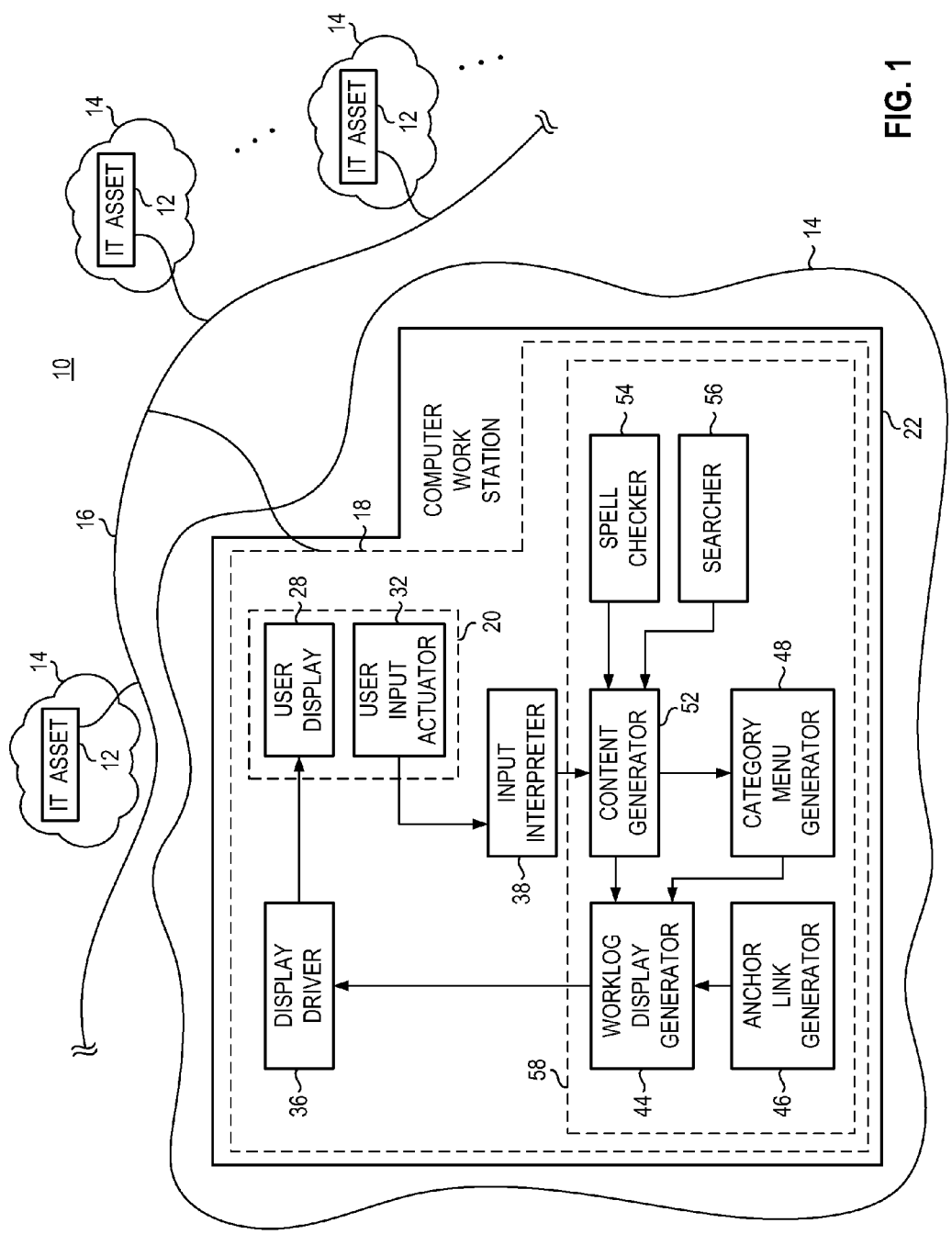
FIG. 1 illustrates a functional block diagram of an exemplary arrangement in which an embodiment of the present invention is operable.

Referring first to FIG. 1, an exemplary arrangement, shown generally at 10, includes a plurality of IT (Information Technology) assets 12 positioned at a plurality of enterprise locations 14. The IT assets 12 are connected together, here by way of a network arrangement 16, such as a wide area network, to provide for communication connectivity between the assets. The exemplary arrangement 10 is representative of the IT assets 12 of a multi-site business, or other, enterprise that uses computer processing devices, or other IT assets 12, at multiple sites and networked together, such as by a virtual private network, wide area network, or the like. More generally, the arrangement is representative of any of various configurations of assets 12 that are connected in communication connectivity and in which incidents related to individual ones of the assets 12 are reported and updated.

As mentioned previously, an IT organization of the enterprise, or with which the enterprise contracts, is sometimes encharged with the maintenance of the IT assets 12 of the organization. In the event of malfunction of an asset 12, personnel of the IT organization are, therefore, responsible for the remediation of the incident. And, as also noted previously, a trouble ticket is conventionally generated to report an IT incident. The trouble ticket is initially generated by any appropriate personnel that become aware of the incident. And, updates to the trouble ticket are made, as appropriate. A conventional trouble ticket is generally in diary form. And, if the worklog entries are extensive, the trouble ticket formed therefrom is sometimes difficult to comprehend readily.

Accordingly, pursuant to an embodiment of the present invention, a manner is provided by which better to form a trouble ticket of improved readability. Apparatus 18 of an embodiment of the present invention is positioned at an enterprise location 14 and is connected to the network 16. In the exemplary implementation, the apparatus 18 is embodied at, and forms a portion of, a computer work station 22. The computer work station 22, while separately referenced, is also an IT asset 12 of the enterprise. And, also, while apparatus 18 is shown at only a single one of the enterprise locations 14, such apparatus 18, for instance, is embodied at each of the enterprise locations 14 or, for instance, at each of the IT assets 12 of the enterprise 14. If, e.g., each of the IT assets 12 comprises a computer workstation 22, the apparatus 18 is embodied at each of, or a selected number of, the workstations 22. The apparatus 18 provides for the generation of a trouble ticket having a worklog that is of improved readability.

The apparatus 18 is functionally represented, implementable in any desired manner, including algorithms executable by processing circuitry. The apparatus 18, while configured in the exemplary implementation at a computer workstation 22, is, in other implementations, distributed amongst more than one physical entity and suitably connected together.

Here, the apparatus 18 includes a user interface 20 formed of a user display 28 and a user input actuator 32. The display 28 and actuator 32 comprise, for instance, a computer display screen and an input keyboard, respectively. A display driver 36 drives the user display 28 to cause displays to be displayed upon the user display 28. And, an input interpreter 38 is positioned to interpret actuations made at the user input actuator 32.

The apparatus further includes a worklog display generator 44, an anchor length generator 46, a category menu generator 48, a content generator 52, a spell checker 54, and a searcher 56. The entities 44-56 are embodied, for instance, by a control entity 58, of the computer workstation 22.

In operation, when an IT incident is detected, a trouble ticket is initiated by way of the apparatus 18. Pursuant to the initiation of the trouble ticket, information related to the incident, such as text, or other information, is input by way of the input actuator 32, interpreted by the interpreter 38, and provided to the content generator 52. The content generator 52 generates the content in a desired format to permit, upon its application to the worklog display generator 44 the content to form part of a worklog. In one implementation, the spell checker 54 operates concurrent to operation of the content generator 52 to spell-check the information as the information is operated upon by the content generator 52. In another implementation, the spell checker 54 operates upon request, such as by user request, to check already-entered information.

Pursuant to generation of the worklog display of the trouble ticket, the anchor link generator 46 also operates. The anchor link generator 46 generates anchor links, hypertext links, or the like, associated with information input by way of the actuator 32 and operated upon by the content generator 52. The anchor link forms a content table entry of a table of contents formed of successive entries, i.e., information portions, that are generated pertaining to the IT incident. The table of contents, so-formed, are displayed with the worklog, such as at the top portion thereof. In one implementation, the table of contents forms a display separate from the associated worklog and portions thereof. The anchor links are top-level identifications of their associated worklog portions that provide a navigation tool by which a reviewer navigates through the worklog by way of the hyperlinks of which the anchor links are formed in the exemplary implementation.

Additionally, when information input by way of the input actuator 32 is generated by the content generator 52, the category menu generator 48 generates a pull-down menu displayable on the user display 28 to provide for menu-selection of a category with which the input information is associated. The selected category, selected from the pull-down menu, is associated with the information that is input. As successive portions of information are input, and content is generated therefrom, each successive portion of the worklog is identified, i.e., prefaced by, its associated category.

Subsequent to the initial input of information associated with the IT incident, additional information is, if appropriate, also entered. The additional information is entered at the same workstation 22, or if appropriate, at another workstation 22. For instance, the IT incident might first be reported at, or proximate to, an IT asset with which the incident is associated. Subsequently, service, or other support personnel might enter additional information regarding the incident, such as steps taken to remediate the problem. With each additional input, a separate worklog portion is formed, identified by an anchor link and categorized by a category, due to operation of the generators 46 and 48.

Figure 2:
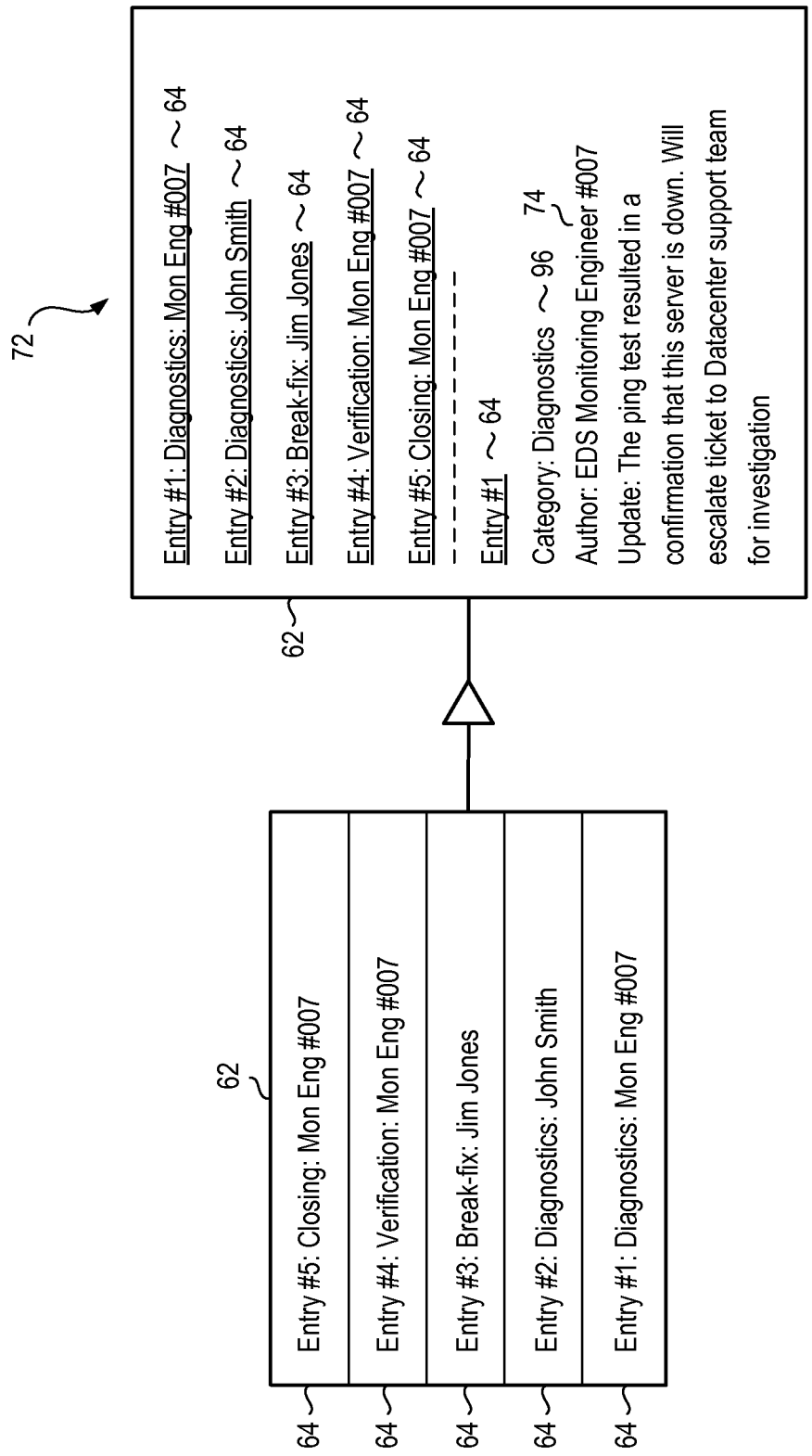
FIG. 2 illustrates an exemplary worklog generated pursuant to operation of an embodiment of the present invention.

Turning next to FIG. 2, an exemplary table-of-contents 62 formed of anchor links 64, is shown. The left-most (as shown) representation shows the table-of-contents 62 in isolation, such as that which appears in an implementation in which the user display 28 first displays the table-of-contents on a page separate from the worklog information. And, the right-most (as shown) representation illustrates the table-of-contents 62 formed at a top portion of a worklog 72 that forms part of a trouble ticket. The anchor links 64 are linked to associated information portions of the worklog. Upon selection of a link, a link is taken to the associated information. For instance, if selection is made of the top-most anchor link, i.e., entry number one, the display links to the corresponding information associated with entry number one, also shown in FIG. 2. That is to say, the anchor link 64 is positioned together with the portion 74 of the worklog that is associated with the anchor link. The illustrated portion of the worklog 72 further shows a category 96 of "diagnostics" that is selected from the pull-down category menu.

Figure 3:
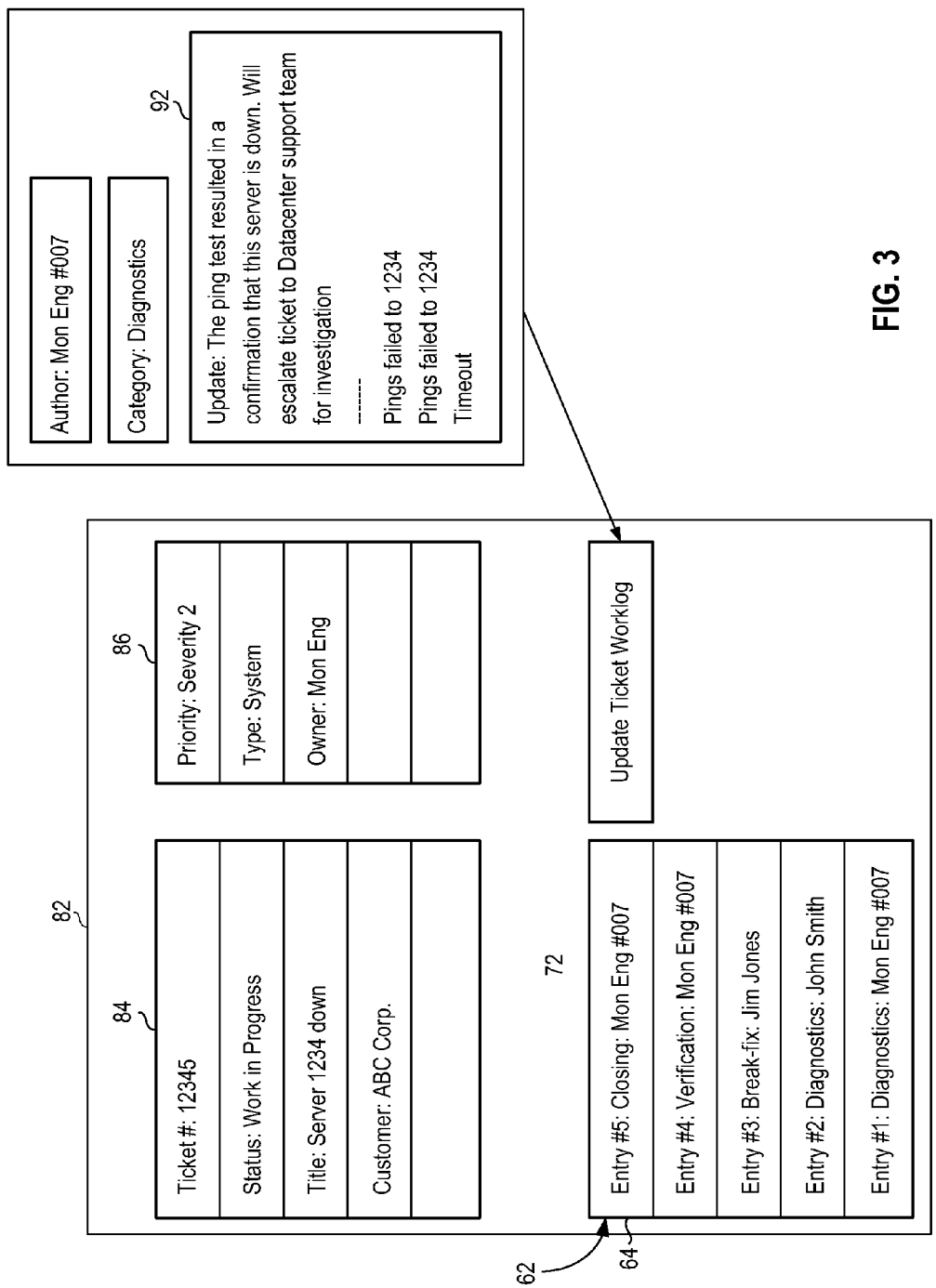
FIG. 3 illustrates further exemplary displays generated pursuant to further exemplary operation of an embodiment of the present invention.

FIG. 3 illustrates an exemplary trouble ticket 82 generated pursuant to an embodiment of the present invention. The ticket includes a plurality of fields including a worklog 72, analogous to the worklog 72 shown in FIG. 2. The trouble ticket also includes an identification field 84, here identifying the ticket number, its status, a title of the ticket, and an originating entity. The portion of the worklog shown in the exemplary display comprises the table-of-contents formed of the plurality of anchor links 64 forming the content entries. An additional field 86 identifies additional information associated with the incident associated with the trouble ticket, here including the priority of the trouble ticket, the entity to which the incident pertains, and the responsible personnel, here a monitoring engineer.

An expanded portion of the trouble ticket also includes a new worklog dialog box 92 representative of an additional input to the worklog that includes an author indication, a category, and informational text.

FIG. 4 illustrates another worklog 72 also exemplary of a worklog generated pursuant to an embodiment of the present invention. Again, a table-of-contents 62 formed of a plurality of anchor links 64 forming content-table entries appears at a top portion of the worklog 72. And, portions of the text of the worklog are segregated into portions 74, each segregated by its associated anchor link 64 and category designation 96.

Here, the operation of the searcher 56 (shown in FIG. 1) is illustrated. The searcher here holds and underlines searched words.

Figure 5:
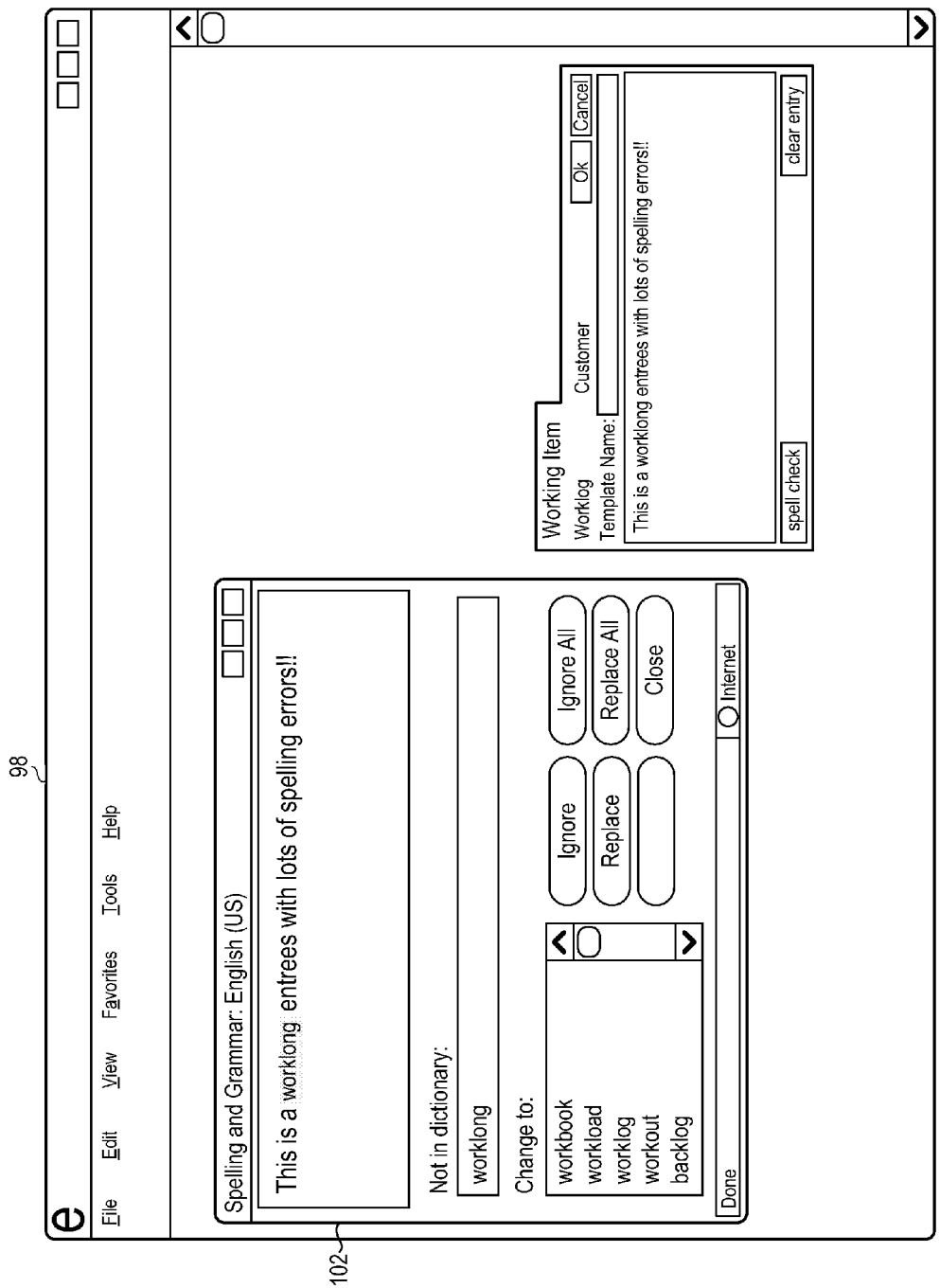
FIG. 5 illustrates another exemplary display generated pursuant to further exemplary operation of an embodiment of the present invention.

FIG. 5 illustrates another display 98 generated pursuant to operation of an embodiment of the present invention. Here, a spell-check window 102 appears to identify words believed to be misspelled. An opportunity to correct for the misspelled words is provided. In one implementation, a dictionary is maintained to facilitate correction of misspelled words.

Figure 6:
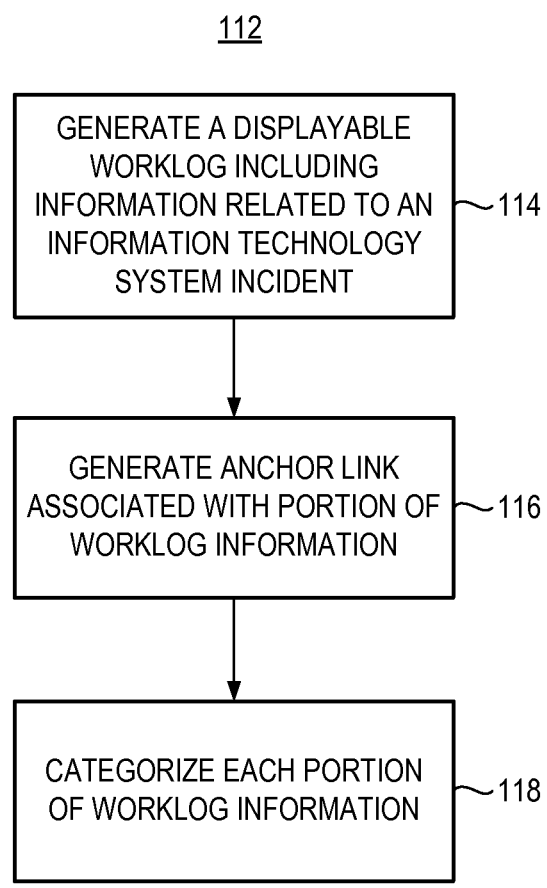
FIG. 6 illustrates a method flow diagram representative of the method of operation of an embodiment of the present invention.

FIG. 6 illustrates a method flow diagram, shown generally at 112, representative of the method of operation of an embodiment of the present invention. The method is for generating a ticket related to an IT system incident.

First, and as indicated by the block 114, a displayable worklog is generated in which information related to the IT system incident is includable. The worklog forms part of the ticket.

Then, and as indicated by the block 116, at least a first anchor link (64, FIGS. 2, 3, and 4) is generated. The anchor link (64, FIGS. 2, 3, and 4) is associated with a corresponding at least first portion of the information related to the IT system incident. The first anchor link (64, FIGS. 2, 3, and 4) forms a first table-of-content entry associated with the corresponding at least first portion of the information.

And, as indicated by the block 118, each portion of the information is categorized with a category (96, FIGS. 2 and 4) selected from a category menu.

Thereby, through operation of an embodiment of the present invention, a manner is provided by which to form a trouble ticket that is of improved readability. By improving the readability of the trouble ticket, erroneous remediation, and other problems associated with misinterpretations of input information is less likely to occur.

Presently preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims.

What is claimed is:

1. A method for generating a ticket related to an IT, Information Technology, system incident said method comprising the operations of:
    generating a displayable worklog in which information related to the IT system incident is includable, the worklog forming part of the ticket; and
    generating at least a first anchor link associated with a corresponding at least first portion of the information related to the IT system incident that is includable in the displayable worklog generated during said operation of generating the displayable worklog, the first anchor link forming a first table of content entry associated with the corresponding at least first portion of the information.

2. The method of claim 1 further comprising the operation of categorizing each portion of the information with a category selected from a category menu.

3. The method of claim 1 further comprising the operation of searching for and locating selected text that forms part of the information includable in the worklog display.

4. The method of claim 1 further comprising the operation of spell-checking text forming the information related to the IT system incident.

* * * * *